United States Patent
Kriebernegg et al.

(10) Patent No.: US 10,677,898 B2
(45) Date of Patent: Jun. 9, 2020

(54) OPTICAL DRIVER ARRANGEMENT AND METHOD FOR GENERATING A DRIVER SIGNAL

(71) Applicant: ams AG, Premstaetten (AT)

(72) Inventors: Josef Kriebernegg, Graz (AT); Christian Mautner, Fernitz (AT); David Mehrl, Plano, TX (US); Kerry Glover, Rockwall, TX (US)

(73) Assignee: ams AG, Premstaetten (AT)

( * ) Notice: Subject to any disclaimer, the term of this patent is extended or adjusted under 35 U.S.C. 154(b) by 570 days.

(21) Appl. No.: 15/507,241

(22) PCT Filed: Aug. 24, 2015

(86) PCT No.: PCT/EP2015/069352
§ 371 (c)(1),
(2) Date: Feb. 27, 2017

(87) PCT Pub. No.: WO2016/030328
PCT Pub. Date: Mar. 3, 2016

(65) Prior Publication Data
US 2017/0285145 A1    Oct. 5, 2017

Related U.S. Application Data

(60) Provisional application No. 62/042,938, filed on Aug. 28, 2014.

(30) Foreign Application Priority Data

Sep. 30, 2014   (EP) .................................... 14187139

(51) Int. Cl.
*G01S 7/484*   (2006.01)
*G01S 7/486*   (2020.01)
(Continued)

(52) U.S. Cl.
CPC ............ *G01S 7/484* (2013.01); *G01S 7/4861* (2013.01); *G01S 7/4865* (2013.01);
(Continued)

(58) Field of Classification Search
CPC ...... G01S 17/026; G01S 17/10; G01S 7/4868; G01S 7/4861; G01S 7/4865; G01S 7/484; G01S 17/04
(Continued)

(56) References Cited

U.S. PATENT DOCUMENTS 5,923,427 A    7/1999  Dong
9,300,405 B2 *  3/2016  Nuttgens .......... H04B 10/50572
(Continued)

FOREIGN PATENT DOCUMENTS

EP    1414154 A1    4/2004
JP    2003-218455 A   7/2003

OTHER PUBLICATIONS

Data Sheet, "TCS3772—Color Light-to-Digital Converter with Proximity Sensing," Sep. 2012, pp. 1-32, TAOS145B, ams AG.

*Primary Examiner* — Daniel L Murphy
(74) *Attorney, Agent, or Firm* — Fish & Richardson P.C.

(57) ABSTRACT

An optical driver arrangement (10) comprises a comparator (11) and a pulse generator (15). The comparator (11) comprises a first input (12) for receiving a sensed output signal (S1) derived from a sensor signal (S2) generated by a light sensor (24), a second input (13) for receiving a reference signal (S3) and a comparator output (14) for providing a comparator signal (S4). The pulse generator (15) comprises a control input (16) coupled to the comparator output (14) and a generator output (22) for providing a driver signal (S5) to a light source (21). The driver signal (S4) comprises a series of at least one pulse and a parameter of the driver signal (S4) is controlled by the comparator signal (S4).

17 Claims, 6 Drawing Sheets

(51) Int. Cl.
*G01S 17/02* (2020.01)
*G01S 17/10* (2020.01)
*G01S 7/4865* (2020.01)
*G01S 7/4861* (2020.01)
*G01S 17/04* (2020.01)

(52) U.S. Cl.
CPC ............ *G01S 7/4868* (2013.01); *G01S 17/04* (2020.01); *G01S 17/10* (2013.01)

(58) Field of Classification Search
USPC ........................................................ 356/4.01
See application file for complete search history.

(56) References Cited

U.S. PATENT DOCUMENTS

| | | |
|---|---|---|
| 2002/0131034 A1 | 9/2002 | Chien et al. |
| 2007/0121095 A1 | 5/2007 | Lewis |
| 2010/0157279 A1 | 6/2010 | Sun et al. |

\* cited by examiner

| 0 | 0 | 0 | 0 | 0 | 0 | A9 | A8 | A7 | A6 | A5 | A4 | A3 | A2 | A1 | A0 |

S8·K=S8·16:

| 0 | 0 | A9 | A8 | A7 | A6 | A5 | A4 | A3 | A2 | A1 | A0 | 0 | 0 | 0 | 0 |

S11=S8·K / S7=S8·16 / S7:

| 0 | 0 | V13 | V12 | V11 | V10 | V9 | V8 | V7 | V6 | V5 | V4 | V3 | V2 | V1 | V0 |

OPTICAL DRIVER ARRANGEMENT AND METHOD FOR GENERATING A DRIVER SIGNAL

BACKGROUND OF THE INVENTION

The present application is related to an optical driver arrangement and a method for generating a driver signal.

An optical driver arrangement generates a driver signal that is provided to a light source such as a light-emitting diode, abbreviated to LED. For optical proximity detection or optical gesture detection, the light source emits a single pulse or a fixed number of pulses, called a pulse burst. Light that is reflected by a target such as a hand is detected by a light sensor such as a photo diode. If for example the target is coming closer to the light sensor, then the reflected light gets stronger and saturation of a measured signal might occur.

SUMMARY OF THE INVENTION

In an embodiment, an optical driver arrangement comprises a comparator and a pulse generator. The comparator comprises a first input for receiving a sensed output signal, a second input for receiving a reference signal, and a comparator output for providing a comparator signal. The sensed output signal may be derived from a sensor signal generated by a light sensor. The pulse generator comprises a control input coupled to the comparator output and a generator output for providing a driver signal to a light source. The driver signal comprises a series of at least one pulse. A parameter of the driver signal is controlled by the comparator signal.

Advantageously, the comparator provides a feedback between the sensed output signal and the pulse generator. The driver signal is controlled by the comparator signal such that the sensed output signal is kept lower than a maximum value and, thus, saturation of the sensed output signal is avoided. The optical driver arrangement performs an automatic pulse control of pulses emitted by the light source. The optical driver arrangement is designed for gesture and/or proximity detection.

In an embodiment, a parameter of the driver signal is a number, a width, a frequency and/or a distance of pulses. The optical driver arrangement controls the amount of energy emitted by the light source by adjusting at least one of said parameters of the driver signal. The at least one of said parameters of the driver signal may be controlled by the comparator signal.

In an embodiment, an energy amount of a light emitted by the light source is reduced during the series of at least one pulse, when the sensed output signal is higher than the reference signal. Thus, a parameter of the driver signal may be adjusted in order to limit said amount of energy.

In an embodiment, a parameter of the driver signal is among others a number, a height, a width, a frequency and a distance of pulses. The amount of energy emitted by the light source is a function of said parameters of the driver signal. The optical driver arrangement controls the amount of energy emitted by the light source by adjusting at least one of said parameters of the driver signal.

In an embodiment, an increase of the energy amount of the light emitted by the light source during the series of at least one pulse is stopped, when the sensed output signal is higher than the reference signal. The pulse generator does not generate a further pulse of the series of at least one pulse, when the sensed output signal is higher than the reference signal.

In an embodiment, the automatic pulse control controls the number of emitted light pulses in a way that signal saturation is limited significantly. This results in a wider distance detection range of a target.

In an embodiment, the pulse generator adjusts a number of pulses of the series of at least one pulse of the driver signal as a function of the comparator signal. When the sensed output signal is higher than the reference signal, the comparator provides the comparator signal having a value that the pulse generator stops generating a further pulse. Thus, the number of pulses is fixed and will not rise. When the sensed output signal is lower than the reference signal, the comparator provides the comparator signal having such a value that the pulse generator generates a further pulse. Thus, the number of pulses of the driver signal is increased.

In an embodiment, a distance signal corresponds to the amount of light that is received by the light sensor. The distance signal can be calculated as a function of the sensed output signal and of the number of pulses.

In an embodiment, the pulse generator is configured to set at least one factor of the series of at least one pulse of the driver signal as a function of the comparator signal. The factor is one of a group consisting of a height of a pulse, a width of a pulse, a frequency of the pulses and a distance of two pulses. Thus, the factor and the number of the pulses are examples of the parameter of the driver signal that is controlled by the comparator signal. The distance signal may be calculated as a function of the sensed output signal as well as the number and the controlled factor of the pulses.

In an embodiment, the pulse generator adjusts the height of a pulse of the series of at least one pulse of the driver signal as a function of the comparator signal. When the sensed output signal is higher than the reference signal, the height of a following pulse of the driver signal is decreased. When the sensed output signal is lower than the reference signal, the height of the following pulse is kept constant.

In an embodiment, the driver signal generates a first pulse of the series of at least one pulse with a first height and generates a second pulse of the series of at least one pulse having a second height. The second pulse follows the first pulse. The second height is equal to the first height, when the sensed output signal is lower than the reference signal at the end of the first pulse. The second height is lower than the first height, when the sensed output signal is higher than the reference signal at the end of the first pulse. Similarly, a third height of a third pulse may also depend on the comparison of the sensed output signal and the reference signal at the end of the second pulse. The distance signal can be calculated as a function of the sensed output signal as well as the number and the heights of the pulses.

In an embodiment, the pulse generator adjusts a width of a pulse of the series of at least one pulse of the driver signal as a function of the comparator signal. The width can also be named length, duration or on-time. When the sensed output signal is lower than the reference signal at the end of a pulse, the width of the pulses is kept constant. Furthermore, when the sensed output signal is higher than the reference signal at the end of a pulse, the width of the following pulse is reduced by the pulse generator.

In an embodiment, the pulse generator adjusts a frequency of the pulses of the series of at least one pulse of the driver signal as a function of the comparator signal. The frequency is kept constant, when the sensed output signal is lower than the reference signal at the end of a pulse. The frequency is decreased, when the sensed output signal is higher than the reference signal at the end of a pulse. The inverse of the frequency is the cycle time. The cycle time is equal to the sum of the on-time and an off-time.

In an embodiment, the pulse generator adjusts a distance of two pulses of the series of at least one pulse of the driver signal as a function of the comparator signal. The distance of two pulses is increased, when the sensed output signal is higher than the reference signal at the end of a pulse. The distance of two pulses is kept constant, when the sensed output signal is lower than the reference signal at the end of a pulse. The distance of two pulses may be implemented as off-time.

In an embodiment, the height and/or the width and/or the frequency and/or the distance of two pulses are variable during each series of at least one pulse.

In an alternative embodiment, the pulse generator generates the driver signal having the series of at least one pulse and a further series of at least one pulse. During the series of at least one pulse, the height, the width, the frequency of the pulses and the distance of two pulses are constant. When the sensed output signal at the end of the series of at least one pulse is higher than the reference signal, the number and/or the height and/or the width and/or the frequency of the pulses is decreased and/or the distance of two pulses is increased. When the sensed output signal at the end of the series of at least one pulse is smaller than the reference signal, the pulses of the further series of at least one pulse have the same number, height, width, frequency and distance than the pulses of the series of at least one pulse.

In an alternative embodiment, the number and/or height and/or width and/or frequency of pulses of the driver signal is increased and/or the distance of pulses is decreased, when the sensed output signal is lower than the reference signal, and the number and/or height and/or width and/or frequency and/or distance of pulses is kept constant, when the sensed output signal is higher than the reference signal.

In a further development, the comparator is implemented as a window comparator receiving the reference signal and a further reference signal which has a lower value than the reference signal. The window comparator generates the comparator signal and a further comparator signal. The number and/or height and/or width and/or frequency of the pulses and/or the distance of two pulses of the driver signal may be decreased, increased and kept constant depending on the comparison of the sensed output signal with the reference signal and the further reference signal.

In an embodiment, the comparator is realized as the window comparator. The pulse generator stops generating a further pulse of the series of at least one pulse, when the sensed output signal is higher than the reference signal. When the sensed output signal is lower than the reference signal, but higher than the further reference signal, the pulse generator generates a further pulse of the series of at least one pulse, wherein the height and/or the width and/or the frequency of the further pulse is decreased and/or the distance to the further pulse is increased. When the sensed output signal is lower than the further reference signal, the pulse generator generates a further pulse of the series of at least one pulse without changing any parameter of the pulse.

In an embodiment, the optical driver arrangement comprises an analog-to-digital converter, abbreviated to AD converter. The sensed output signal may be received at an input of the AD converter. The input of the AD converter may be connected to the first input of the comparator.

In an embodiment, the optical driver arrangement comprises a node at which the sensed output signal is tapped. The first input of the comparator and the input of the AD converter are both connected to the node.

In an embodiment, the reference signal is constant. The reference signal may have a predetermined value.

In an alternative embodiment, the reference signal is a variable signal. The reference signal is a function of the number of pulses of the series of at least one pulse. The reference signal may be increased after each of the pulses of the series of at least one pulse.

In an embodiment, the optical driver arrangement comprises a digital-to-analog converter, abbreviated to DA converter. An output of the DA converter is coupled to the second input of the comparator. The DA converter generates the reference signal that is provided to the second input of the comparator. The DA converter increases the reference signal after each pulse.

In an embodiment, the pulse generator comprises a control output that is coupled to an input of the DA converter. Thus, the reference signal depends on a control signal tapped at the control output. The control signal increases with the number of the pulses which were already generated by the pulse generator within the series of at least one pulse.

In an embodiment, the control signal at the converter control output is equal to the number of pulses which were already generated by the pulse generator within the series of at least one pulse.

The sensed output signal may be generated by integrating the sensor signal during a sample time.

In an embodiment, the height and the width of the pulses of a series of pulses are constant. Thus, the sensor signal generated by the light sensor can be assumed to be constant also. The sensed output signal is increased by the sensor signal during each of the pulses. At the end of the first pulse, the sensed output signal is compared with the reference signal having a first value that is less than half of a maximum value of the sensed output signal. If the sensed output signal is less than half of the maximum value, then the pulse generator can generate a second pulse without causing a saturation of the sensed output signal. At the end of the second pulse, the sensed output signal is compared with the reference signal having a value less than two thirds of the maximum value. If the sensed output signal at the end of the second pulse is less than said reference signal, the pulse generator can generate a third pulse without causing a saturation of the sensed output signal. The sensed output signal having more than the maximum value may cause saturation for the AD converter. Said maximum value is predetermined.

In an embodiment, the optical driver arrangement comprises a sum and hold stage. An input of the sum and hold stage receives the sensor signal or a signal derived from the sensor signal. An output of the sum and hold stage may be coupled to the first input of the comparator. At the output of the sum and hold stage, the sensed output signal may be tapped. The output of the sum and hold stage may be coupled to the input of the AD converter.

In an embodiment, the optical driver arrangement comprises an ambient light subtractor. An input of the ambient light subtractor receives the sensor signal. An output of the ambient light subtractor is coupled to the input of the sum and hold stage.

In an alternative embodiment, the input of the SUM and hold stage is coupled to the first input of the comparator. At the input of the sum and hold stage, the sensed output signal is tapped. The output of the ambient light subtractor may be coupled to the first input of the comparator.

In an embodiment, the optical driver arrangement comprises the light sensor. The light sensor may be realized as a photo diode. The light sensor generates the sensor signal. The light sensor may be coupled to the first input of the comparator, for example via the series circuit of the ambient light subtractor and the sum and hold stage.

In an embodiment, the optical driver arrangement comprises the light source. The light source may be realized as a light-emitting diode, abbreviated to LED. The light source receives the driver signal. The light source is coupled to the output of the pulse generator.

In an embodiment, the optical driver arrangement comprises a digital circuit. An input of the digital circuit is coupled to the pulse generator, for example to a parameter output of the pulse generator or to the control output of the pulse generator. A further input of the digital circuit may be coupled to an output of the AD converter. The digital circuit receives a digital output signal derived by digitalization of the sensed output signal and an information generated by the pulse generator such as the number of pulses of the series of at least one pulse and/or the heights of the pulses and/or the widths of the pulses and/or the frequencies of the pulses and/or the distances of two pulses. The digital circuit generates the distance signal as a function of these information.

In an embodiment, the optical driver arrangement takes several samples. The start of the samples is equidistant. The samples are clocked with a constant frequency. For each sample, the pulse generator generates the driver signal consisting of one series of at least one pulse. The series of at least one pules is performed during the sample time. During the sample time, one sample of the sensed output signal is determined. The series of at least one pulse is realized as a burst of the driver signal. Each sample of the sampled output signal, of the digital output signal and of the distance signal is provided using exactly one burst of the driver signal. The parameter of the driver signal may be adjusted by the comparator signal during each sample.

In an embodiment, a method for generating a driver signal comprises generating a sensed output signal as a function of a sensor signal provided by a light sensor, generating a comparator signal as a function of a comparison of the sensed output signal and a reference signal, and providing a driver signal to a light source. The driver signal comprises a series of at least one pulse. A parameter of the driver signal is controlled by the comparator signal.

Advantageously, the feedback from the light sensor to the light source limits the rise of the sensed output signal. Thus, saturation of the sensed output signal can be avoided.

In an embodiment, a parameter of the driver signal is a number, a width, a frequency and/or a distance of pulses.

An amount of energy emitted by the light source is controlled by adjusting the parameter of the driver signal or by adjusting at least one of said parameters of the driver signal. The at least one of said parameters of the driver signal may be controlled by the comparator signal.

BRIEF DESCRIPTION OF THE DRAWINGS

The following description of figures may further illustrate and explain exemplary embodiments. Insofar as components, circuits and method steps correspond to one another in terms of their function in different figures, the description thereof is not repeated for each of the following figures.

FIGS. 4A to 4C show exemplary embodiments of calculations performed the optical driver arrangement.

DETAILED DESCRIPTION

Figure 1A:
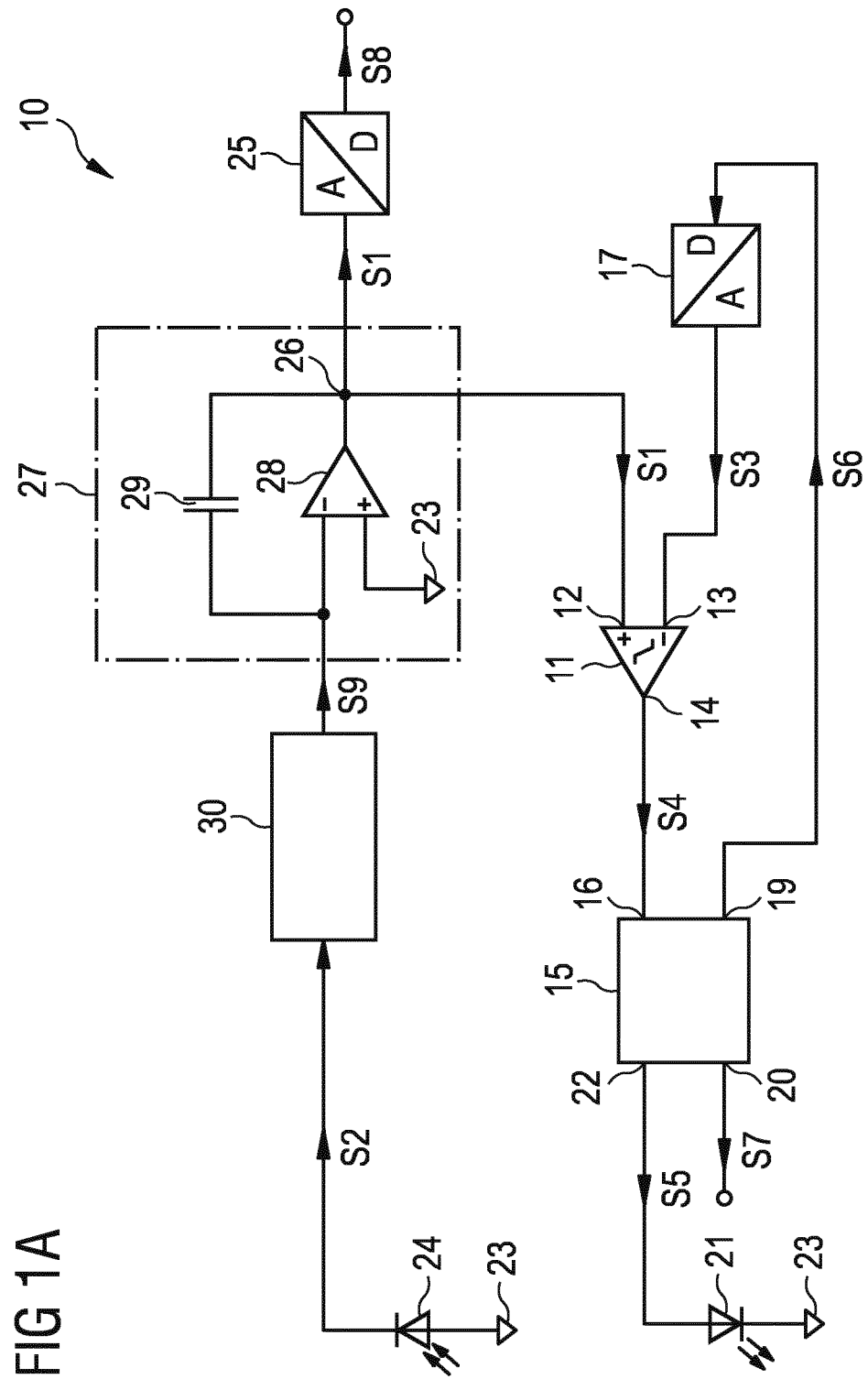
FIGS. 1A to 1C show exemplary embodiments of an optical driver arrangement.

FIG. 1A shows an exemplary embodiment of an optical driver arrangement 10. The optical driver arrangement 10 comprises a comparator 11 having a first input 12, a second input 13 and a comparator output 14. The optical driver arrangement 10 comprises a pulse generator 15 having a control input 16 that is connected to the comparator output 14.

Moreover, the optical driver arrangement 10 comprises a DA converter 17 having an output that is coupled to the second input 13 of the comparator. The pulse generator 15 comprises a control output 19 that is connected to an input of the DA converter 17. The pulse generator 15 also comprises a parameter output 20. Additionally, the optical driver arrangement 10 comprises a light source 21 that is coupled to a generator output 22 of the pulse generator 15. The light source 21 is arranged between the generator output 22 and a reference potential terminal 23. The light source 21 is realized as an LED. For example, the light source 21 is fabricated as an infrared LED.

Furthermore, the optical driver arrangement 10 comprises a light sensor 24 that is coupled to the first input 12 of the comparator 11. The light sensor 24 may be implemented as a photo diode. The optical driver arrangement 10 comprises an AD converter 25 having an input that is connected to the first input 12 of the comparator 11. A node 26 of the optical driver arrangement 10 is connected to the input of the AD converter 25 and to the first input 12 of the comparator 11.

Additionally, the optical driver arrangement 10 comprises a sum and hold stage 27. An input of the sum and hold stage 27 is coupled to the light sensor 24. An output of the sum and hold stage 27 is connected via the node 26 to the input of the AD converter 25 and to the first input 12 of the comparator 11. The sum and hold stage 27 comprises an amplifier 28 having an input coupled to a terminal of the photo sensor 24 and an output connected to the node 26. A further terminal of the light sensor 24 is connected to the reference potential terminal 23. The output of the amplifier 28 is coupled via an integrating capacitor 29 of the sum and hold stage 27 to the input of the amplifier 28. A further input of the amplifier 28 may be connected to the reference potential terminal 23. The input of the amplifier 28 may be realized as an inverting input and the further input of the amplifier 28 may be implemented as a non-inverting input.

Furthermore, the optical driver arrangement 10 comprises an ambient light subtractor 30 that couples the light sensor 24 to the input of the sum and hold stage 27. The terminal of the light sensor 24 is connected via the ambient light subtractor 30 to the input of the amplifier 28.

A sensed output signal S1 is provided to the first input 12 of the comparator 11. The sensed output signal S1 may be realized as an analog signal, optionally as an analog voltage. The sensed output signal S1 is a function of a sensor signal S2 provided by the light sensor 24. The sensor signal S2 is generated as a function of reflected light received by the light sensor 21. The sensor signal S2 may have the form of a current. The sensor signal S2 is generated as a photo current. A reference signal S3 is applied to the second input 13 of the comparator 11. A comparator signal S4 is generated by the comparator 11 as a function of a comparison of the sensed output signal S1 and of the reference signal S3. The comparator signal S4 is fed to the control input 16 of the pulse generator 15. The pulse generator 15 generates a driver signal S5 at the generator output 22 as a function of the comparator signal S4. The comparator signal S4 may comprise the information to stop the pulses or not to stop the pulses of the driver signal S5. The comparator signal S4 may be a digital signal.

The driver signal S5 is applied to the light source 21. The light source 21 emits light depending on the driver signal S5. The light is emitted in pulse form by the light source 21. The emitted light may be reflected by a not shown target. A portion of the reflected light is detected by the light sensor 24 that generates the sensor signal S2.

The DA converter 17 generates the reference signal S3. The pulse generator 15 generates a control signal S6 at the control output 19. The control signal S6 is applied to the input of the DA converter 17. A value of the reference signal S3 depends on the control signal S6.

Moreover, the pulse generator 15 generates a parameter signal S7 at the parameter output 20. The parameter signal S7 corresponds to the number of pulses provided by the pulse generator 15 in a series of at least one pulse.

The sensed output signal S1 is also provided to the AD converter 25. The sensed output signal S1 is implemented as a proximity and/or gesture sensed output signal. The AD converter 25 generates a digital output signal S8 as a function of the sensed output signal S1. The digital output signal S8 represents a digitized value of the reflected light. The digital output signal S8 is designed for proximity and/or gesture detection. The sensed output signal S1 is generated during a sample time. After the sample time the sensed output signal S1 is digitized into the digital output signal S8. The series of at least one pulse occur during the sample time. The sample time may have a predetermined duration.

The sensor signal S2 is provided to the ambient light subtractor 30. The ambient light subtractor 30 reduces an influence of ambient light on the sensor signal S2. A subtractor signal S9 generated by the ambient light subtractor 30 is provided to the sum and hold stage 27. The sum and hold stage 27 generates the sensed output signal S1 by integrating the subtractor signal S9 during the sample time. The sample time may be longer than an integrating time.

The optical driver arrangement 10 is configured for optical gesture and/or optical proximity detection. The optical driver arrangement 10 operates in a non-contact mode.

The pulse generator 15 may comprise a not-shown current source with an output connected to the generator output 22. The current source may provide the driver signal S5 in current form. Furthermore, the pulse generator 15 may be coupled to a not-shown clock. The driver signal S5 may be generated by means of a clock signal of the clock.

In an alternative, not shown embodiment, the light source 21 is arranged between a supply voltage terminal and the generator output 22 of the pulse generator 15.

Figure 1B:
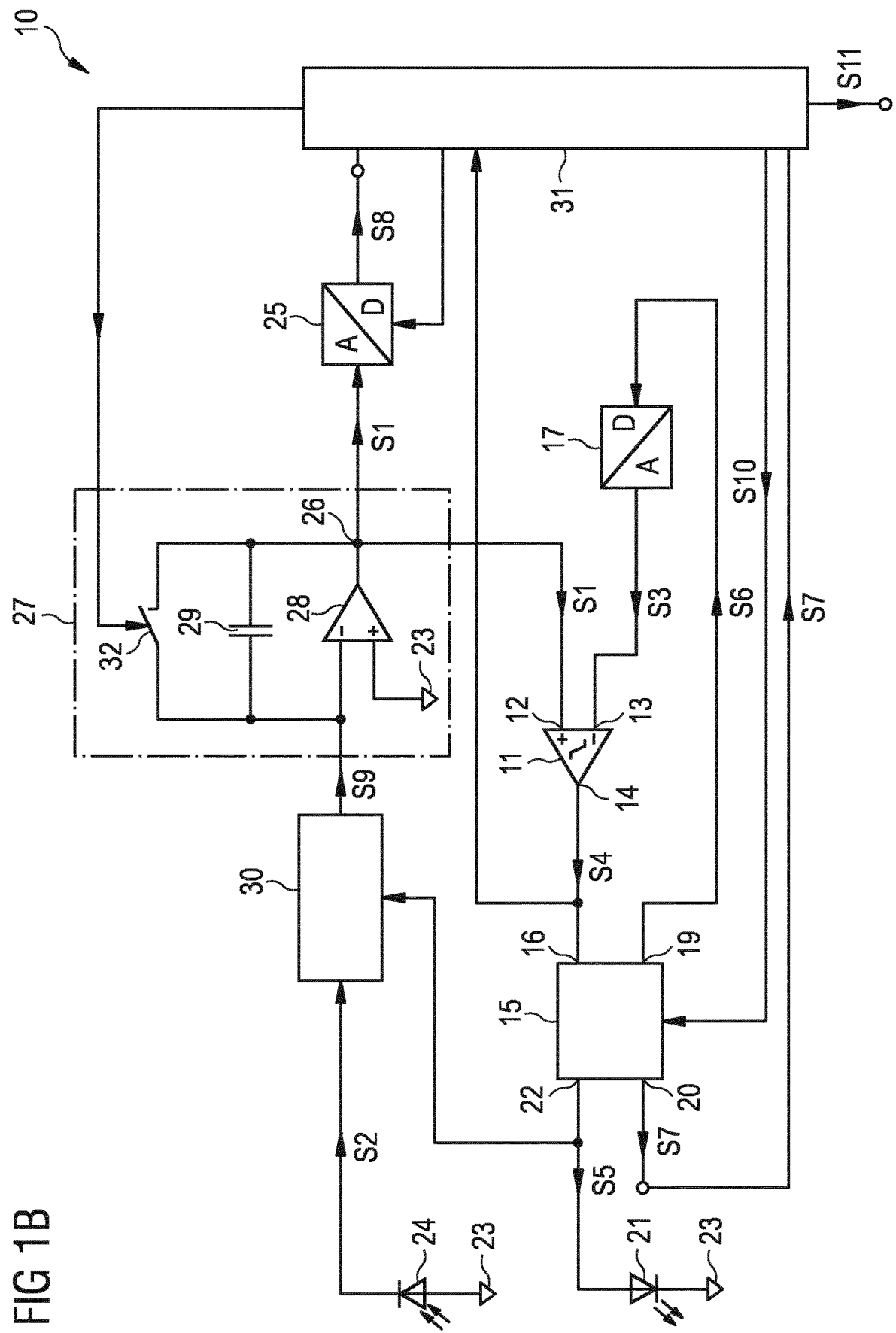

FIG. 1B shows a further exemplary embodiment of the optical driver arrangement 10 which is a further development of the embodiment shown in FIG. 1A. The pulse generator 15 is coupled, for example, via its generator output 22 to a further input of the ambient light subtractor 30. Thus, the ambient light subtractor 30 receives the information whether the light source 21 is switched on for emitting light and the sensor signal S2 depends on the reflected light and on an ambient light, and whether the light source 21 is switched off and the sensor signal S2 is only a function of the ambient light. The ambient light subtractor 30 uses this information to reduce the influence of the ambient light on the subtractor signal S9 provided to the suns and hold stage 27.

Moreover, the optical driver arrangement 10 comprises a digital circuit 31 that is coupled on its input side to the output of the AD converter 25. Moreover, the digital circuit 31 is connected on its input side to the pulse generator 15. For example, the digital circuit 31 may be connected on its input side to the parameter output 20 of the pulse generator 15. Alternatively, the digital circuit 31 may be connected on its input side to the control output 19 of the pulse generator 15. Additionally, the digital circuit 31 is coupled on its output side to control terminals of the pulse generator 15, of the AD converter 25 and of the sum and hold stage 27. The comparator output 16 may be coupled to the digital circuit 31.

The sum and hold stage 27 comprises a reset switch 32 that connects the two terminals of the integrating capacitor 29 to each other. The digital circuit 31 is connected to a control terminal of the reset switch 32. The digital circuit 31 may be implemented as a small processor, a micro-processor, a micro-controller, a state machine or a circuit comprising logic gates.

The driver arrangement 10 takes several samples. The samples are started in a regular time flame. For example, the optical driver arrangement 10 starts every 50 ms to take a new sample. Before taking a new sample, the digital circuit 31 provides a signal to the sum and hold stage 27. Thus, the sensed output signal S1 is set to zero. This may be achieved by short circuiting the two electrodes of the integrating capacitor 29 by closing the reset switch 32.

At the start of the new sample, the digital circuit 31 provides a start signal S10 to the pulse generator 15. Thus, the pulse generator 15 starts the driver signal S5 which has a series of at least one pulse. During a first pulse of the series of at least one pulse of the driver signal S5, the control signal S6 provides a first digital value to the DA converter 17 that generates a first analog value of the reference signal S3 that is provided to the second input 13 of the comparator 11. In case the sensed output signal S1 is higher than the first value of the reference signal S3, the comparator signal S4 stops the pulse generator 15. Thus, the pulse generator 15 only generates one pulse for this sample. The parameter signal S7 provides the information that the number of pulses is only one to the digital circuit 31.

The digital circuit 31 triggers the AD converter 25. Thus, the digital circuit 31 receives the digital output signal S8 as a function of the sensed output signal S1 at the end of the sample time. The digital circuit 31 calculates a distance signal S11 as a function of the digital output signal S8 and of the parameter signal S7. The distance signal S11 may be proportional to the digital output signal S8 divided through the parameter signal S7, In case the sensed output signal S1 is lower than the first value of the reference signal S3 at the end of the first pulse, the comparator signal S4 does not stop the pulse generator 15. Thus, the pulse generator 15 generates a second pulse within the series of at least one pulse of the driver signal S5. During the second pulse, the control signal S6 is increased. Thus, the DA converter 17 generates a second value of the reference signal S3 to the second input 13 of the comparator 11. Moreover, the pulse generator 15 provides the parameter signal S7 with the information that two pulses were generated by the pulse generator 15.

In case the sensed output signal S1 is higher than the second value of the reference signal S3 at the end of the second pulse, the comparator signal S4 stops the pulse generator 15. Correspondingly, in case the sensed output signal S1 is lower than the second value of the reference signal S3 at the end of the second pulse, the pulse generator 15 generates a third pulse. The pulse generator 15 continuously generates further pulses until the pulse generator 15 is stopped by the comparator signal S4 or when a maximum number of pulses is generated.

The digital circuit 31 receives the information that the pulse generator 15 is stopped via the connection of the comparator 11 or the pulse generator 15 to the digital circuit 31. Thus, the digital circuit 31 may trigger the AD converter 25 at the end of the last pulse or at the end of an off-time assigned to the last pulse. The sample time may be adjusted to the number of pulses of the series of at least one pulse and may be not predetermined.

Each of the pulses of the series of at least one pulse of the driver signal S5 has the same height and the same width. Also, the distance of two pulses of the driver signal S5 is constant. An amount of energy of the light that is emitted by the light source 21 is controlled by controlling the number of pulses provided by the pulse generator 15.

In an alternative embodiment, the pulse generator 15 reduces the height of the pulses depending on the comparator signal S4. Alternatively, the pulse generator 15 may control the width of a pulse depending on the comparator signal S4. The pulse generator 15 may be implemented as pulse-width modulator. The information about the heights, respectively the widths, of the pulses is provided from the pulse generator 15 to the digital circuit 31.

Figure 1C:
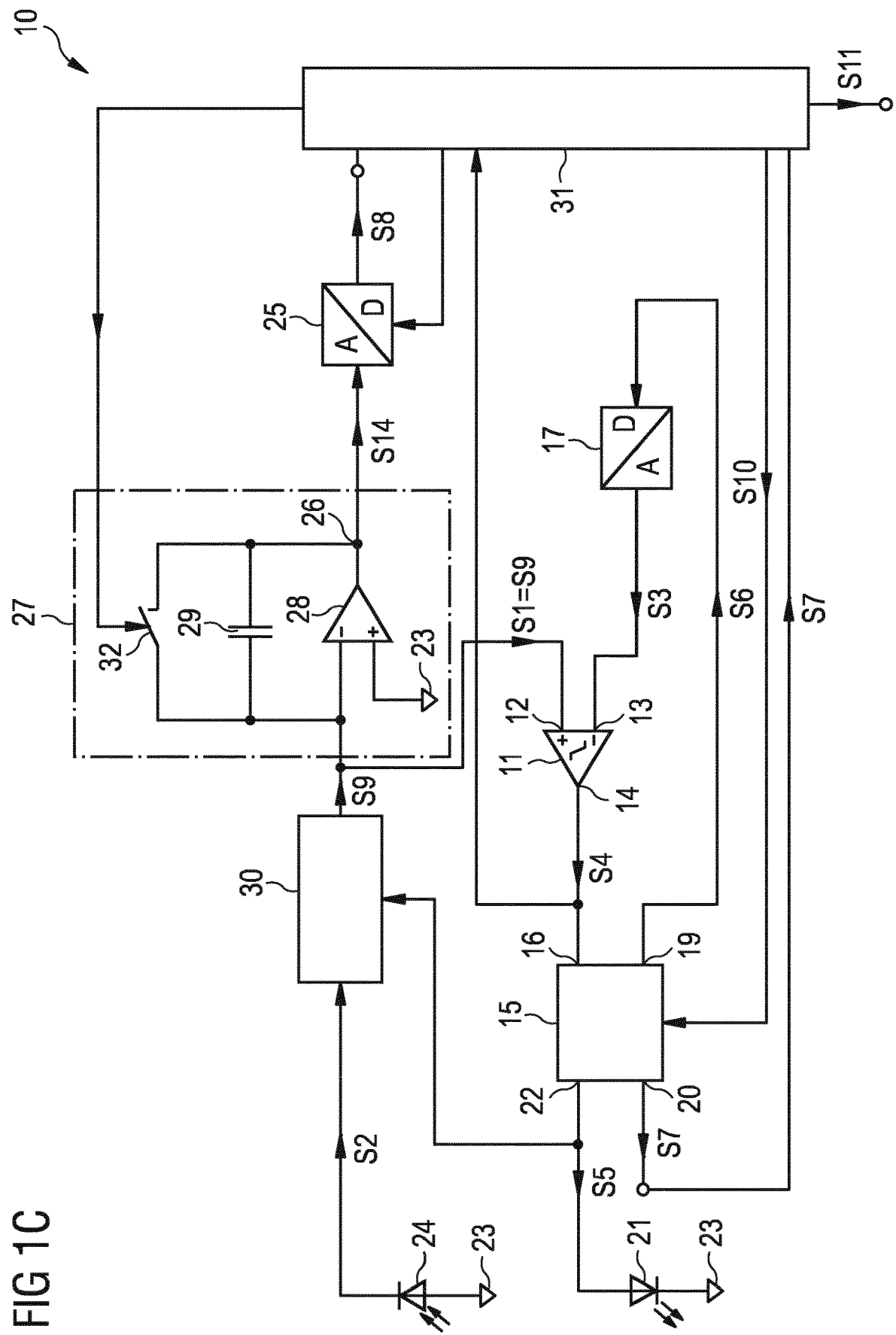

FIG. 1C shows a further exemplary embodiment of the optical driver arrangement 10 which is a further development of the embodiments shown in FIGS. 1A and 1B. The output of the ambient light subtractor 30 is connected to the first input 12 of the comparator 11. Thus, the light sensor 24 is coupled to the first input 12 of the comparator 11 via the ambient light subtractor 30. The first input 12 of the comparator 11 is connected to the input of the sum and hold stage 27. Thus, the first input 12 of the comparator 11 is coupled to the input of the AD converter 25 via the sum and hold stage 27.

The sum and hold stage 27 generates an AD converter input signal S14 that is fed to the AD converter 25. The ambient light subtractor 30 generates the subtractor signal S9 which is equal to the sensed output signal S1 and is provided to the first input 12 of the comparator 11. A saturation of the ambient light subtractor 30 and/or of the sum and hold stage 27 is avoided by feeding the subtractor signal S9 to the first input 12 of the comparator In the optical driver arrangement 10 shown in FIGS. 1A to 1C, the sensed output signal S1 is kept below a maximum value by control of a parameter of the driver signal S5. The maximum value is a predetermined voltage value.

Figure 2:
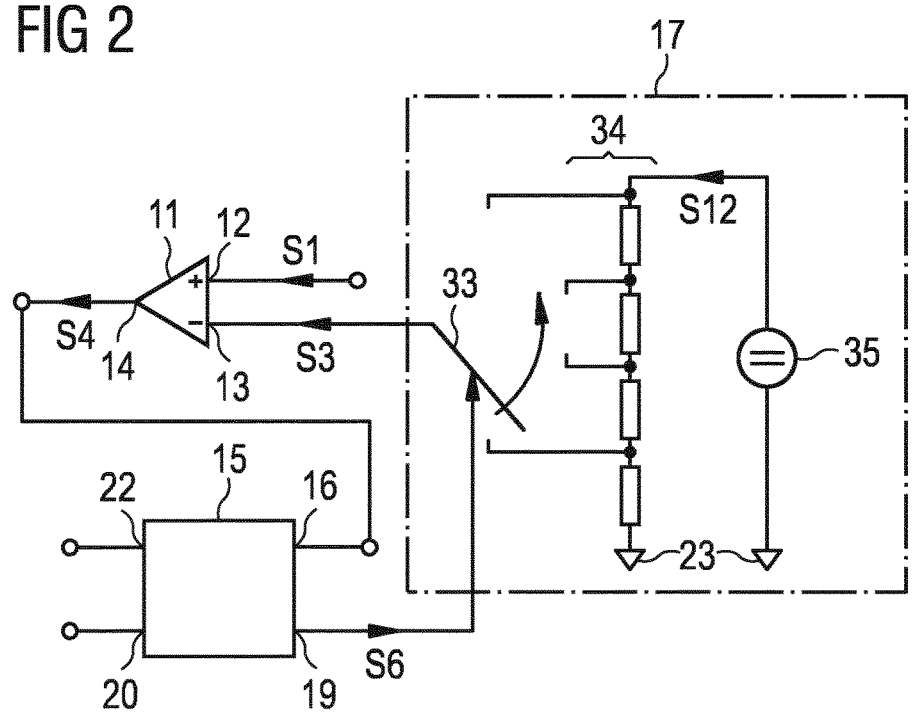
FIG. 2 shows an exemplary embodiment of a detail of the optical driver arrangement.

FIG. 2 shows an exemplary embodiment of a detail of the optical driver arrangement 10. The DA converter 17 as shown in FIG. 2 can be implemented in the optical driver arrangement 10 of FIGS. 1A to 1C. The DA converter 17 comprises a change-over switch 33 and a resistor ladder 34. The change-over switch 33 comprises several inputs which are connected to taps of the resistor ladder 34. An output of the change-over switch 33 is coupled to the second input 13 of the comparator 11. The pulse generator 15 is coupled to a control terminal of the change-over switch 33 via the control output 19. The resistor ladder 34 is arranged between a voltage reference source 35 of the DA converter 17 and the reference potential terminal 23.

The voltage reference source 35 provides a reference voltage S12 to the resistor ladder 34. The change-over switch 33 is controlled by the control signal S6 and selects one of the voltages that can be tapped at the taps of the resistor ladder 34 as the reference signal S3. Here the control signal S6 corresponds to the number of pulses that were already provided by the pulse generator 15 in the series of at least one pulse. Thus, the lowest reference signal S3 is selected during the first pulse, the next higher reference signal S3 is selected during the second pulse and so on. The resistors of the resistor ladder 34 are not equal to achieve a rise of the reference signal S3 with decreasing steps as explained below.

Figure 3:
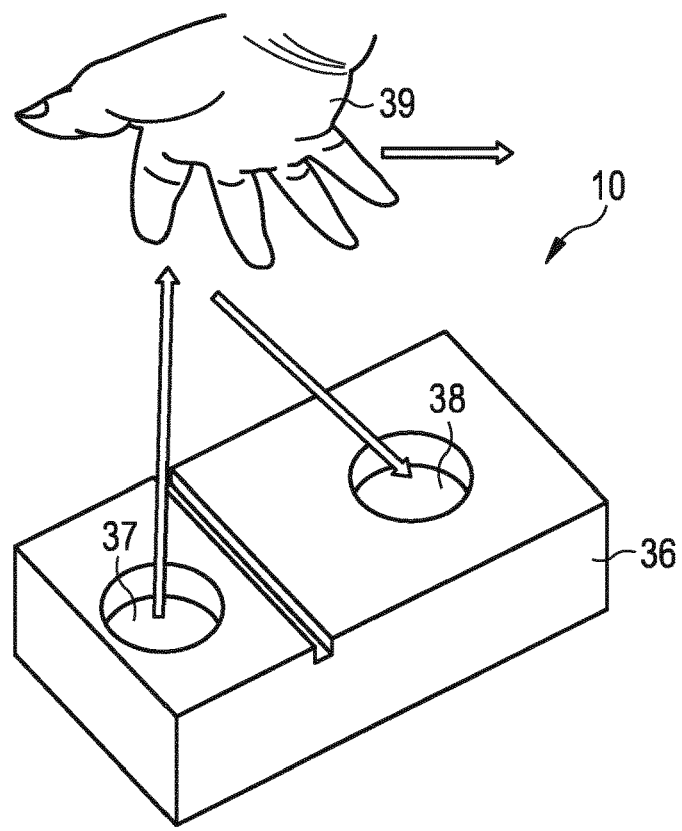
FIG. 3 shows a spatial arrangement of the optical driver arrangement.

FIG. 3 shows an exemplary embodiment of a spatial arrangement of the optical driver arrangement 10. The optical driver arrangement 10 is enclosed in a housing 36. The housing 36 has a first transparent portion 37 under which the light source 21 is arranged. Moreover, the housing 36 has a second light transparent portion 38 under which the light sensor 24 is located. The light source 21 emits light through the first transparent portion 37. The emitted light is reflected by a target 39 which may be a hand. The target 39 may be named as an object. The reflected light is detected by the light sensor 24 through the second transparent portion 38. Thus, the distance signal S11 is a function of a distance of the hand to the light source 21 and/or the light sensor 24.

In case an optical arrangement comprises more than one optical driver arrangement 10, the direction of the movement of the target 39 can be detected. This allows a gesture detection.

In an embodiment, more than one optical driver arrangement 10 as shown in FIG. 1A to 1C are combined for proximity and/or gesture detection. Thus, the number of light sensors and the number of light sources is equal.

In an alternative embodiment, the light source 21 is used for emitting wherein the reflected light is detected by more than one light sensor 24. Thus, the number of light sources 21 is smaller than the number of light sensors 24. The number of light sources 21 may be one. Each of the light sensors 24 is coupled to a separate comparator 11 as shown in FIG. 1A to 1C. If one of the comparators 11 detects that one of the sensed output signals S1 is larger than the reference signal S3, the pulse generator 15 stops generating further pulses. Thus, the saturation of the AD converter 25 also for the channel which receives the largest portion of the reflected light is avoided.

The optical driver arrangement 10 implements an optical gesture respectively proximity detection working principle or procedure. Optical proximity respectively gesture detection is performed by measuring a reflection of the target 39 for example a hand being seen or moved over the light sensor 24. In general, non-directional light sensors 24 may be used for proximity detection. Directional light sensors 24 may be used to identify the direction in which the target 39 has been moved, for example up-to-down or left-to-right, such as for gesture detection.

Advantageously, the optical driver arrangement 10 automatically controls the number of emitted pulses by an automatic pulse control, abbreviated as APC. Thus, unwanted saturation is avoided and, therefore, the optical driver arrangement 10 is able to extend a target detection range automatically.

The light source 21, such as a LED, sends out light in an automatically controllable number of light pulses (from n=1 to x). This light is reflected by the target 39 and synchronously and simultaneously detected by the light sensor 24 such as a photo diode. The ambient light subtraction block 30 separates the reflected target photo current from the ambient light current. The remaining current charges the sum and hold stage 27. A voltage value of the sensed output signal S1 increases from pulse to pulse depending on the amount of the reflected light of the target 39 and is kept on the output of the sum and hold stage 27. Simultaneously, this voltage is monitored by the comparator 11, where it is compared with an adjustable reference signal S3 which is provided by the DA converter 17.

Depending on which pulse is currently emitted, a corresponding reference signal S3 is provided. The reference signal S3 is implemented in a voltage form and may be called DA converter voltage. For example, after the first pulse the voltage value of the reference signal S3 is 1/2·0.95·input range of the AD converter 25, after the 2nd pulse it is 2/3·0.95·input range, after the 3rd pulse it is 3/4·0.95·input range and so on. The input range is equal to the maximum value of the sensed output signal S1.

As soon as the comparator 11 detects that the sensed output signal S1 is higher than the current reference signal S3, the comparator 11 will generate the comparator signal S4, and the pulse generator 15 will stop the emission of further pulses immediately. In this case, the comparator signal S4 has the effect of a pulse stop signal. After that the final sensed output signal S1 is converted by the AD converter 25 into the digital domain and provided to the digital circuit 31 implemented for example by a processor. The sensed output signal S1 is realized as a sum and hold voltage.

Thereafter, both the value of the digital output signal S5 and the number of pulses are used and combined to result in a new digital value of the distance signal S11. This value (for example 14 bit value) finally represents the amount of the reflected light and gives the information about the distance or the location of the target 39. Thus, a corresponding digital proximity and/or gesture value is calculated using the distance signal S11. The detection will work in an extended detection range and significantly limit signal saturation.

The distance signal S11 may be determined within the digital domain in different ways such as: To get the value of the distance signal S11 from the (number of pulses, value of the digital output signal S8) tuple, the following calculation is used:

S11=S8/(number of pulses)

Because the voltage level at the integration capacitor 29 is increased with every pulse, the digital output signal S8 has to be normalized to the theoretic level at one pulse. The digital output signal S8 is for example 10 bits wide, the number of pulses is for example 6 bits. The number of pulses of the series of at least one pulse may have a predetermined maximum number. For example, up to 64 pulses can be generated.

FIG. 4A shows an exemplary embodiment of a calculation of the distance signal S11. An APC calculation for gesture detection is illustrated in FIG. 4A. The first row shows the digital output signal S8 which is loaded from the output of the AD converter 25 into the digital circuit 31. The digital output signal S8 may be realized as a 10 bit value. The digital circuit 31 multiplies the digital output signal S8, for example, by the factor K=16. The multiplication can be realized by shifting the bits four times to the left. The multiplied value of the digital output signal S8 is then divided by the number of pulses to calculate the distance signal S11. The parameter signal S7 contains the information of the number of pulses.

If the number of pulses is 1, then the maximum value 0x3ff0 can be reached. The higher the number of pulses, the lower will be the value of the distance signal S11. If the number of pulses is larger than 16, then the least significant bits, abbreviated as LSBs, from the division are lost, at the maximum of 64 pulses, two LSBs are lost. However, even in that case 8 ADC bits are preserved, so no significant information gets lost.

An example of a decimal calculation is: The value of the digital output signal S8 (10 bit)=511 and the number of pulses=8 until APC control stopped emission of pulses. Then the value of the distance signal S11 is 511·16/8=1022.

Figures 4B, 4C:
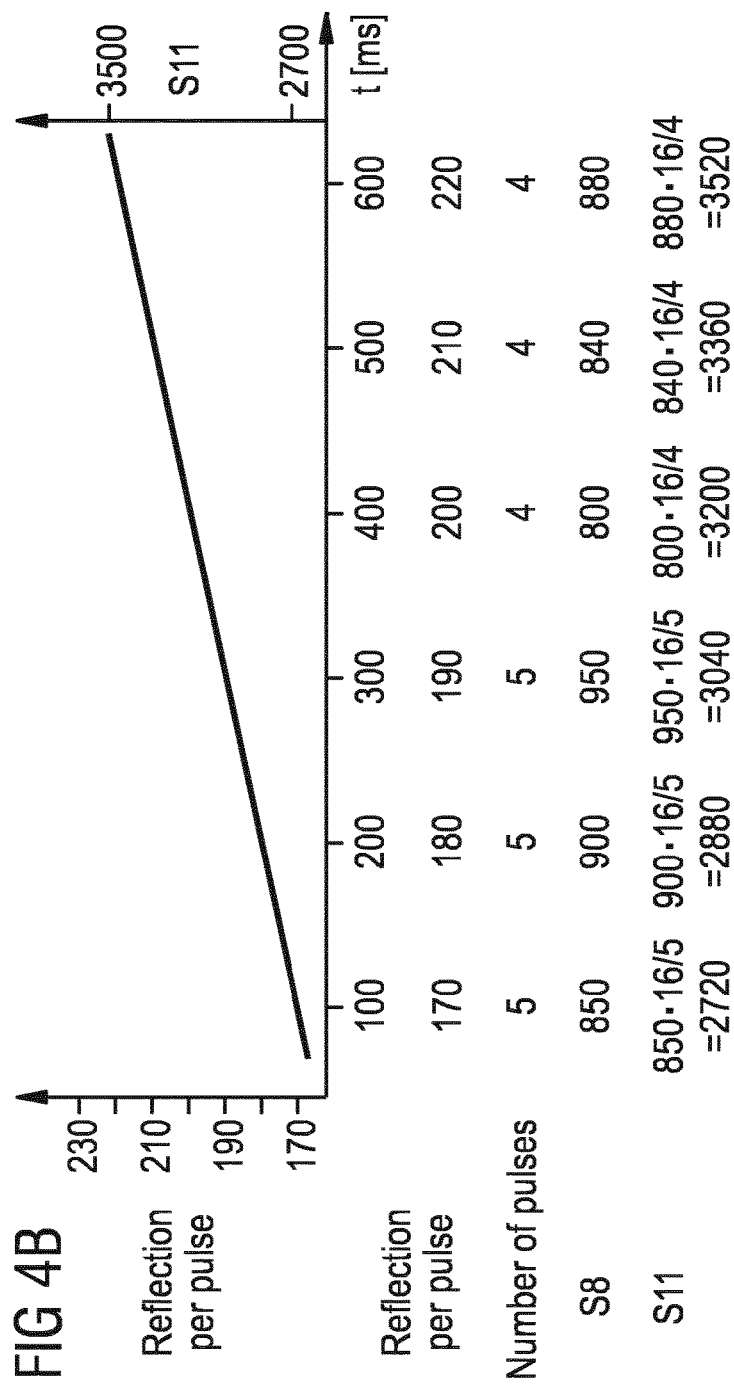

FIG. 4B shows an exemplary calculation of the distance signal S11 in case of a rising reflection. Six samples are taken by the optical driver arrangement 10. Each of the six samples in the table contains information about the reflection per pulse, the number of pulses in the series of at least one pulse, the digital output signal S8 and the distance signal S11. Since the reflection per pulse increases from 170 to 220 in artificial units, the number of pulses in the different samples decreases from five to four. The digital output signal S8 can be calculated by multiplying the reflection per pulse and the number of pulses. Correspondingly to the calculation shown in FIG. 4A, the distance signal S11 can be calculated by the equation:

$$S11 = \frac{S8}{S7} \cdot K,$$

wherein S8 is the digital output signal, S7 is the parameter signal and K is a constant. For example, the constant K may have the value 1 or 16.

In FIG. 4B, a simulation of a ramp signal is illustrated. A change from 5 pulses to 4 pulses is performed during acquisition of the ramp. The reflection power per pulse is increasing by 10 artificial units from sample to sample in this example, and after the intermediate calculations the distance signal S11 increases by 160 units from sample to sample. There is no non-linearity in the switch from 5 pulses to 4 pulses. The calculated value of the distance signal S11 matches the reflection linearly. In general the division may introduce digital noise, but the example uses round numbers for illustration. Also the analog noise may increase with (the root of) the number of pulses.

FIG. 4C shows an exemplary calculation of a proximity signal S13. A not-shown optical arrangement may comprise, for example, four optical driver arrangements 10 as shown in FIG. 1A to 1C. Thus, the optical arrangement comprises four light sensors 24. The four light sensors 24 may be directed in four directions, such as a North, South, West and East direction. The four distance signals S11 generated by the use of four optical driver arrangements 10 as shown above are designed for gesture detection.

However, the distance signals S11 of the four optical driver arrangements 10 can be combined to a proximity signal S13. For the calculation of the proximity signal S13, all light sensors or a selection of the light sensors are used. The table elucidated in FIG. 4C shows the equations for the calculation of the proximity signal S13 depending on the number N of enabled light sensors.

Alternatively, the optical arrangement comprises at least one light source 21 and at least one light sensor 24. The optical arrangement may be configured for optical proximity detection. The number of light sources 21 and the number of light sensors 24 may be exactly one.

Alternatively, the optical arrangement comprises at least one light source 21 and at least two light sensors 24. The optical arrangement may be configured for optical gesture detection and/or optical proximity detection. The number of light sources 21 may be smaller than the number of light sensors 24. The number of light sources 21 may be exactly one. The number of light sensors 24 may be four. The at least one light source 21 is used for emitting light, wherein the reflected light is detected by the at least two light sensors 24. Each of the light sensors 24 is coupled to a separate ambient light subtractor 30 followed by a separate sum and hold stage 27 as shown in FIG. 1A to 1C. Thus, each of the light sensors 24 is coupled to a separate comparator 11. If one of the comparators 11 detects that one of the sensed output signals S1 is larger than the reference signal S3, the pulse generator 15 stops generating further pulses.

In FIG. 4C, an APC Calculation for proximity detection is illustrated. For proximity, all or some gesture diode signals, for example the sensed output signals S1 or the digital output signals S8 or the distance signals S11, might be used. The so called pmask bits define which light sensor 24 is taken into account. The light sensor 24 may be called gesture diode. Therefore, the pmask bits are evaluated, and a regular mean average is calculated from those light sensors 24 that are enabled. Let d0, d1, d2, d3 be the digital output signals S8 of those light sensors 24 that are enabled. The table in FIG. 4C shows the results for the different number N of enabled light sensors 24. In a calculation example (decimal), the number of pulses is 8 until APC control stopped emission of pulses and all four light sensors 24 are used:

Value of the digital output signal S8 for $d0$(10 bit) =255

Value of the digital output signal S8 for $d1$(10 bit) =252

Value of the digital output signal S8 for $d2$(10 bit) =250

Value of the digital output signal S8 for $d3$(10 bit) =239

Proximity signal $S13=(255+252+250+239)/4 \cdot 16/8=996/4 \cdot 16/8=498$

The optical driver arrangement 10 increases the limited detection range in optical sensor devices. Thus, the optical driver arrangement 10 makes possible an extension of the detection range in proximity and/or gesture detection.

The invention claimed is:

1. An optical driver arrangement, comprising:
a comparator having a first input for receiving a sensed output signal derived from a sensor signal generated by a light sensor, a second input for receiving a reference signal and a comparator output for providing a comparator signal, and
a pulse generator having a control input coupled to the comparator output and a generator output for providing a driver signal to a light source,
wherein the driver signal comprises a series of at least one pulse,
wherein the pulse generator is operable to generate pulses continuously until the pulse generator is stopped by the comparator signal or until a maximum number of pulses is generated,
wherein the optical driver arrangement comprises a digital-to-analog converter having an output that is coupled to the second input of the comparator for providing the reference signal to the second input of the comparator,
wherein the pulse generator comprises a control output that is coupled to an input of the digital-to-analog converter, and wherein the reference signal is a function of a number of pulses of the series of at least one pulse and the reference signal is increased after each of the pulses of the series of at least one pulse.

2. The optical driver arrangement according to claim 1, wherein an increase of an energy amount of a light emitted by the light source during the series of at least one pulse is stopped, when the sensed output signal is higher than the reference signal.

3. The optical driver arrangement according to claim 1, comprising an analog-to-digital converter having an input that is coupled to the first input of the comparator.

4. The optical driver arrangement according to claim 1, comprising a sum and hold stage having an input for receiving the sensor signal or a signal derived from the sensor signal, wherein the first input of the comparator is coupled to an output of the sum and hold stage or to the input of the sum and hold stage.

5. The optical driver arrangement according to claim 4, comprising an ambient light subtractor having an input for receiving the sensor signal and an output that is coupled to the input of the sum and hold stage.

6. The optical driver arrangement according to claim 1, comprising the light sensor for generating the sensor signal and being coupled to the first input of the comparator.

7. The optical driver arrangement according to claim 1, comprising the light source for receiving the driver signal and being coupled to the generator output of the pulse generator.

8. The optical driver arrangement according to claim 1, comprising a digital circuit having an input coupled to the pulse generator.

9. The optical driver arrangement according to claim 1, wherein the comparator signal is a digital signal.

10. The optical driver arrangement according to claim 1, wherein the maximum number of pulses is a predetermined maximum number.

11. The optical driver arrangement according to claim 1, wherein at the end of the first pulse, the sensed output signal is compared with the reference signal having a first value that is less than half of a maximum value of the sensed output signal, and
wherein, if the sensed output signal is less than half of the maximum value, then the pulse generator generates a second pulse and at the end of the second pulse, the sensed output signal is compared with the reference signal having a value less than two thirds of the maximum value.

12. A method for generating a driver signal, comprising:
generating a sensed output signal as a function of a sensor signal provided by a light sensor,
generating a comparator signal by a comparator as a function of a comparison of the sensed output signal and a reference signal, and
providing the driver signal by a pulse generator to a light source, wherein the driver signal comprises a series of at least one pulse, and wherein the pulse generator continuously generates pulses until the pulse generator is stopped by the comparator signal or until a maximum number of pulses is generated,
wherein a digital-to-analog converter provides the reference signal to the comparator,
wherein the pulse generator comprises a control output that is coupled to an input of the digital-to-analog converter, and wherein the reference signal is a function of the number of pulses of the series of at least one pulse and the reference signal is increased after each of the pulses of the series of at least one pulse.

13. The method according to claim 12,
wherein the maximum number of pulses is a predetermined maximum number.

14. The method according to claim 12,
wherein at the end of the first pulse, the sensed output signal is compared with the reference signal having a first value that is less than half of a maximum value of the sensed output signal, and
wherein, if the sensed output signal is less than half of the maximum value, then the pulse generator generates a second pulse and at the end of the second pulse, the sensed output signal is compared with the reference signal having a value less than two thirds of the maximum value.

15. An optical driver arrangement, comprising:
a comparator having a first input for receiving a sensed output signal derived from a sensor signal generated by a light sensor, a second input for receiving a reference signal and a comparator output for providing a comparator signal, and
a pulse generator having a control input coupled to the comparator output and a generator output for providing a driver signal to a light source,
wherein the driver signal comprises a series of at least one pulse, wherein the pulse generator is operable to generate pulses continuously until the pulse generator is stopped by the comparator signal or until a maximum number of pulses is generated.

16. The optical driver arrangement according to claim 15,
wherein the maximum number of pulses is a predetermined maximum number.

17. The optical driver arrangement according to claim 15,
wherein at the end of the first pulse, the sensed output signal is compared with the reference signal having a first value that is less than half of a maximum value of the sensed output signal, and
wherein, if the sensed output signal is less than half of the maximum value, then the pulse generator generates a second pulse and at the end of the second pulse, the sensed output signal is compared with the reference signal having a value less than two thirds of the maximum value.

* * * * *